No. 645,011. Patented Mar. 6, 1900.
W. B. & L. C. REED.
UNDERGROUND SYSTEM OF ELECTRICAL DISTRIBUTION.
(Application filed Aug. 21, 1899.)
(No Model.) 2 Sheets—Sheet 1.
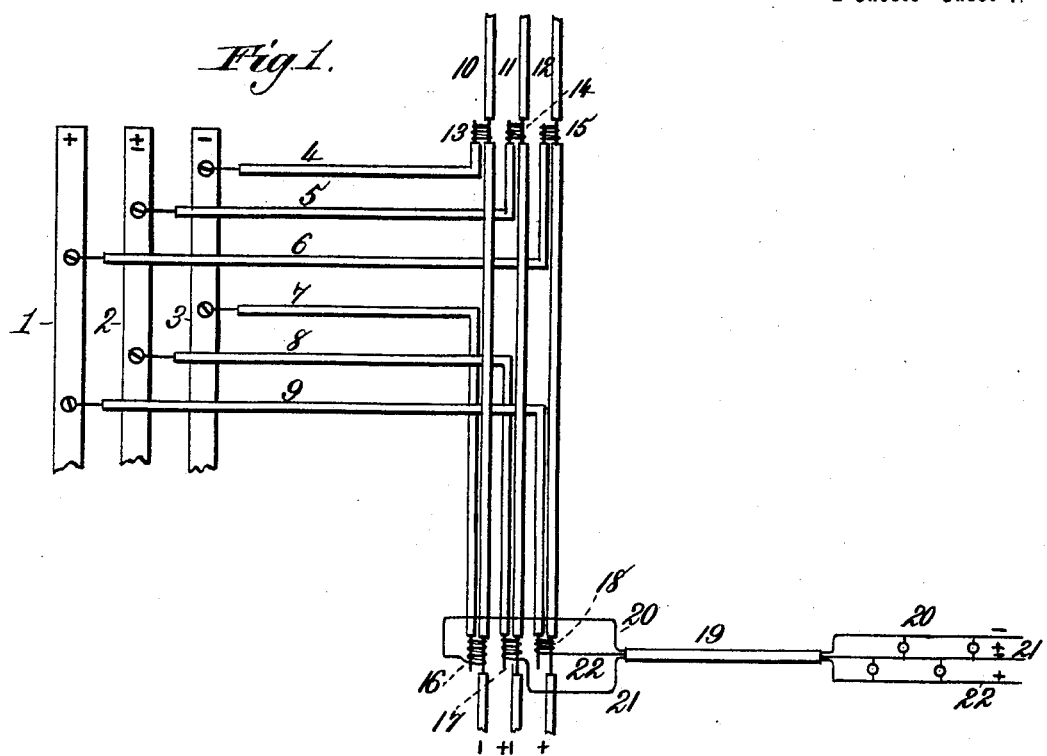
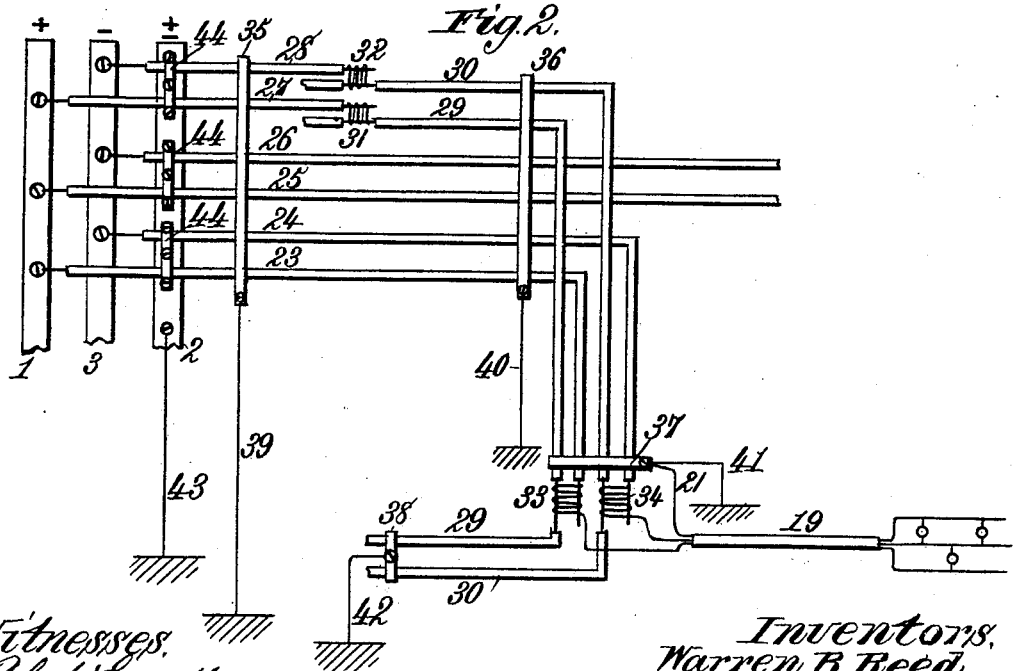
Witnesses:
Robert Emmett
F. B. Keefe
Inventors:
Warren B. Reed,
Lyman C. Reed,
By James L. Norris,
Atty.
THE NORRIS PETERS CO., PHOTO-LITHO., WASHINGTON, D. C.

No. 645,011. Patented Mar. 6, 1900.
W. B. & L. C. REED.
UNDERGROUND SYSTEM OF ELECTRICAL DISTRIBUTION.
(Application filed Aug. 21, 1899.)
(No Model.) 2 Sheets—Sheet 2.
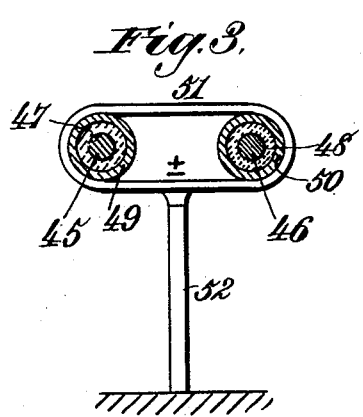
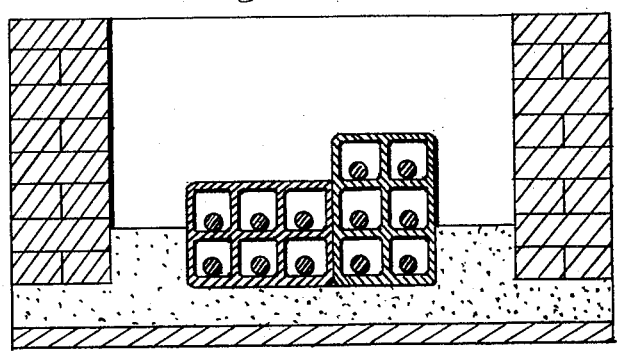
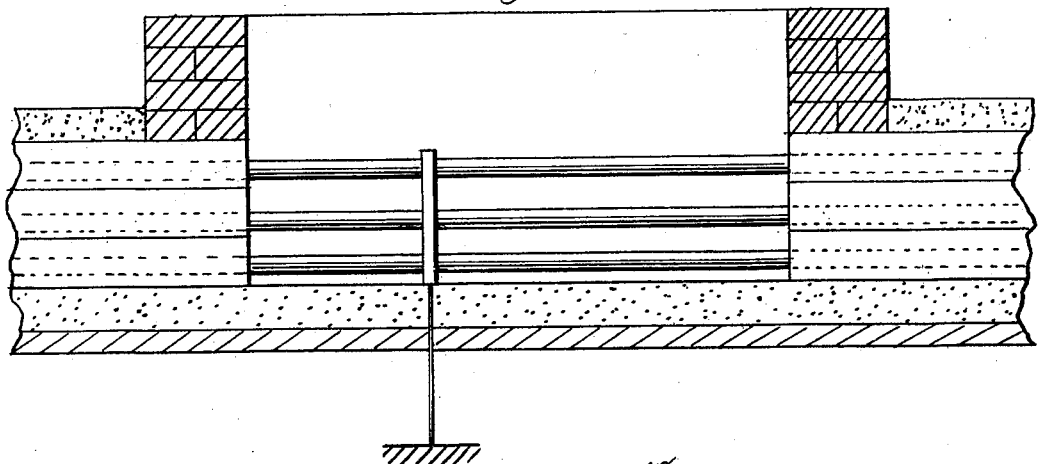
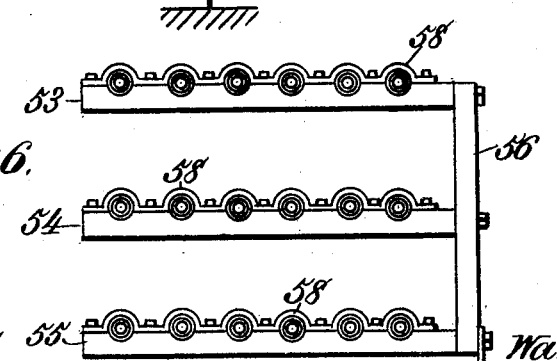
Witnesses.
Robert Everett
Inventors.
Warren B. Reed.
Lyman C. Reed.
By James L. Norris.
Atty.

UNITED STATES PATENT OFFICE.

WARREN B. REED AND LYMAN C. REED, OF NEW ORLEANS, LOUISIANA.

UNDERGROUND SYSTEM OF ELECTRICAL DISTRIBUTION.

SPECIFICATION forming part of Letters Patent No. 645,011, dated March 6, 1900.

Application filed August 21, 1899. Serial No. 728,010. (No model.)

*To all whom it may concern:*

Be it known that we, WARREN B. REED and LYMAN C. REED, citizens of the United States, residing at New Orleans, in the parish of Orleans and State of Louisiana, have invented new and useful Improvements in Underground Systems of Electrical Distribution, of which the following is a specification.

Our invention relates to underground systems of electrical distribution, the object of the same being to effect a saving in the cost of installation and operation and a closer regulation of such systems.

In carrying out the invention the usual neutral conductor-cable of a three-wire system of distribution between the source of supply and service installation is dispensed with, and the metallic sheathings or casings of the positive and negative conductor-cables are utilized in its stead. These casings are permanently bonded and grounded at all available points of the system, thereby producing a neutral equal in practical effect to one of infinite capacity.

The invention therefore consists of the distribution of a three-wire system of generation of current to a three-wire system of house installations by means of a two-wire system of feeders and mains and one common neutral consisting of the bonded and grounded cable-sheathings of the various positive and negative conductors.

The invention also consists in certain details which will be hereinafter more fully described and claimed.

In the drawings forming part of this specification, Figure 1 is a diagrammatic view illustrative of an ordinary three-wire low-tension system of electrical distribution, showing a portion of the underground feeders and mains. Fig. 2 is a similar view illustrative of our improved system. Fig. 3 is a detail cross-sectional view of two positive and negative cables, showing the bonded and grounded connections between the casings thereof. Fig. 4 is a sectional view of a subsidiary manhole, showing the main and feeder cables in their respective conduits. Fig. 5 is a section of the same at right angles to Fig. 4, and Fig. 6 is an elevation of a rack or frame for bonding and grounding a number of cable-casings in a manhole.

Like reference-numerals indicate like parts in the several views.

In Fig. 1 the positive, neutral, and negative busses 1, 2, and 3, respectively, have connected thereto and leading therefrom the feeders 4, 5, 6, 7, 8, and 9, the said feeders being connected to the mains 10, 11, and 12, as shown at 13 14 15 and 16 17 18. The entire system is represented as being free from grounds. The house-service cable 19 incloses wires 20, 21, and 22, which are connected to the mains 10 11 12, as shown. The parts illustrated in this figure and just described constitute a portion of the ordinary underground system of low-tension distribution. In this system the neutral wire is a highly-insulated cable, the same as is used for the positive and negative wires. For the mains this neutral usually has the same carrying capacity as either the positive or negative wires, while for the feeders it is generally installed of lower capacity. From the fact that the cables lie in separate conduits the metallic casings are more or less insulated from each other, as often the grounding of the metallic casings is poor. This causes a difference of potential to be possible, which often results in deleterious electrolytic action. Where it is intended to keep the neutral wire free from grounds, the use of a highly-insulated cable cannot be criticized; but as the permanent grounding of the neutral wire is coming more and more into favor it is obvious that to use an insulated cable and then to ground the inside wire at various points is a vicious construction. It would be preferable in a grounded neutral system to employ a neutral without insulation, which is not only permanently grounded, but grounded more or less along its entire length. In this latter case, as well as where a grounded conductor of an insulated cable is used, the more or less grounded sheathings of the other two wires form parallel conductors. By our invention the neutral as a separate conductor or cable is altogether eliminated by the utilization of the casings or sheathings of all the cables bonded and grounded at every available point, and the neutral thus formed is more effective than insulated neutrals of many times the individual carrying capacity of the cable-casings. The neutral cables, both for the mains and feeders, are dispensed with. The casings of the positive and negative cables are of necessity more or less grounded; but we reinforce our system by bonding and permanently grounding the same at every available point and also grounding the neutral bus at the source of supply. This bonding and grounding is easily effected at every manhole and subsidiary manhole and may also be accomplished at other points on the system and is applied not only to the mains separately and to the feeders separately, but also to the mains and feeders together.

Our system is represented diagrammatically in Fig. 2 of the drawings, in which it will be observed that the positive feeders 23, 25, and 27 lead from the positive bus 1 and the negative feeders 24, 26, and 28 lead from the negative bus 3, the same being connected to the system of mains 29 30 31 and 32 and at 33 and 34. The feeders 25 and 26 are shown as extended to connect with the mains at some other portion of the distribution. The casings of the feeder and main cables are bonded, as shown at 35, 36, 37, and 38, and grounded, as at 39, 40, 41, and 42. The neutral bus 2 is also grounded, as shown at 43. The metallic casings or sheathings of these cables are continuous, although they are illustrated as being broken away, this being done in order to show the connections between the interior conductors. The sheathings of the feeder-cables 23 24 25 26 27 28 are metallically connected to the neutral bus by means of metallic straps 44 44, although any other equivalent means of connection may be substituted for the specific means shown. The house-service cable 19 and the house connections therefrom are identical in all respects to those illustrated in Fig. 1 of the drawings; but the neutral wire 21 instead of being connected to the neutral cable, as in Fig. 1, is electrically connected to the bond 37 between the sheathings of the feeders 23 and 24 and the mains 29 and 30. It is obvious, however, that the neutral 21 may be connected to the metallic sheathing of the cable 19. The particular means by which the bonding and grounding of the sheathings of two adjacent cables may be conveniently effected is illustrated in Fig. 3 of the drawings, wherein 45 46 represent the inner conductors of two cables; 47 48, the insulating material surrounding said conductors; 49 50, the sheathings thereof; 51, the bond connecting the sheathings 49 and 50, and 52 a lead to ground from the bond 51. The bond 51 may be made of any good conductor and is mechanically connected by soldering or other suitable means to the sheathings 49 and 50.

In Figs. 4 and 5 is shown a series of positive and negative feeders and mains passing through a subsidiary manhole at some point of the system, the cables lying in conduits or ducts. The manhole may be of any ordinary form and construction. In Fig. 5 the bonding and grounding of the metallic sheathings of the casings is illustrated.

The means of bonding and grounding illustrated in Figs. 3, 4, and 5 will be found effective for a moderate number of cables, but where a large number is to be bonded and grounded the form of apparatus illustrated in Fig. 6 will be found convenient. In this figure, 53 54 55 represent strips of conducting material yoked together at one end by a bar 56, secured to said strips by bolts or in any other suitable manner, and grounded, as shown at 57. The upper sides of the strips 53 54 55 are preferably formed with sockets for the reception of the feeder and main cables, which are bonded together and secured to said strips by means of straps 58 58, the said straps being secured to said strips 53, 54, and 55 by screws, bolts, or other analogous means.

In the system which is in use at present and which is illustrated diagrammatically in Fig. 1 of the drawings it will be understood that the current flowing on the neutral wire is either positive or negative and is the difference between the load on the positive and negative wires. For this reason the neutral feeders are not generally installed with the same carrying capacity as the other wires, and if the system could be maintained in perfect balance these feeders might be eliminated altogether. In practice, however, they have to be large enough to carry any load due to accident or shut down on one side of the system. The current on the neutral bus 2 at the source of supply is the resultant difference in amperes between the positive and negative load on the entire system. In every well-managed station this difference is carefully looked after, and an even balance on the system is maintained so far as possible. Our experience shows, however, that contrary to the generally-accepted opinion at present the resultant current at the neutral bus does not necessarily represent the total current carried by the neutral feeders. From the fact that the neutral feeders are insulated from each other and carry the resultant differences of current existing at their terminals, which current may be either positive or negative, it will be seen that the resultant current at the bus is the positive or negative excess carried by the feeder-neutrals, and the actual amperes carried by these neutrals may be many times the resultant amperage on the neutral bus. In fact, our experiments show that even when the system is evenly balanced and there is no resultant load on the neutral bus the feeder-neutrals carry current varying with the existing conditions of the load distribution on the mains. This will be the better understood when it is remembered that a system which shows a balance at the bus may be made up of a great number of differences of load at various points on the system, the balancing of which takes place over the neutral mains and neutral feeders in multiple with each other, the load carried by each being divided according to its resistance. It follows then that the lower the resistance of the neutral mains the less current will flow over the feeder-neutrals, and in order to have no flow over the feeder-neutrals or a perfect equalization of the neutral currents on the neutral mains themselves the neutral mains will have to be without resistance or of practically infinite capacity. It also follows that when the system is unbalanced the feeder-neutrals have not only to aid the neutral mains in equalizing the currents, but they have also to carry to the neutral bus the resultant excess of current, either positive or negative. It will be seen, therefore, that it is not only the excess of current flow, either positive or negative, which causes loss of potential tending to lower the potential on one side or the other of the system, but the local unbalancing of the load also causes an unevenness of potential at many points, affecting the regulation of the voltage at these points regardless of the regulation at the source of supply. Economic considerations prohibit the use of neutrals as at present installed large enough to eliminate the losses and evils above set forth, but by our invention these losses and evils are entirely overcome with resultant economies, which will be more fully set forth later.

Our system, as illustrated in Fig. 2 of the drawings, applies to the underground portion only—that is, from the bus at the source of supply to the points where the service-wires of the various installations are connected to the cables leading to the mains. When a three-wire installation is to be connected on our system, the positive and negative wires are connected, respectively, to the positive and negative cables, and the service-neutral is connected to the common neutral consisting of the grounded and bonded cable-casings. It will thus be seen that our system consists of the distribution of a three-wire system of generation of current to a three-wire system of house installation by means of a two-wire system of feeders and mains and a common neutral made up of the bonded and grounded cable-sheathings of the positive and negative conductors. The bonding and permanent grounding of the casings of the positive and negative cables do not increase the potential between the interior conductors and the casing. It eliminates, however, the increase of potential that might otherwise accidentally occur from the grounding of either the positive or negative conductors when the neutral is not grounded. The bonding and grounding of all the feeder and main cable casings at every available point of the system also prevent any difference of potential not only between the casings themselves, but also between the casings and the earth, thereby avoiding the possibility of any deleterious electrolytic action, so harmful to underground systems under ordinary conditions.

In metallic-sheathed casings for underground low-tension systems of distribution the average cross-section of the casing equals approximately two-thirds the cross-section of the inclosed conductor, varying, however, with the size of the conductor. By utilizing both positive and negative cable casings the ratio of the carrying capacity of these two casings, taken together to either inclosed conductor, may be roughly taken as one to seven—that is, if a set of mains be taken at some portion of the system where there are no parallel mains or feeders and if they may, for the sake of illustration, be considered insulated from the earth then they would have a neutral of only one-seventh the carrying capacity of either conductor inside of cables. In practice, however, an isolated set of mains occurs only on a tag-line of the system, and, as shown, the casings of the cables are bonded and grounded at every available point. Now as the feeders and mains increase the bonding and grounding of all the cable-casings at every available point increases the carrying capacity of the neutral many fold. Not only is the carrying capacity increased, but dispensing with the many insulated neutrals and substituting therefor one common neutral reduces the total current to be carried by this neutral to the resultant neutral current, which appears in the present system only at the neutral bus at the source of supply. This will be clearer when it is remembered that with insulated neutrals as at present installed each feeder-neutral is carrying positive or negative currents to be bussed at the source of supply, which total current on the feeders may be many times the resultant current after the differences have been eliminated. The bonding and grounding of all the cable-casings at every available point over the entire system, which is done by us, neutralizes or busses these currents practically at their origin. The only current, therefore, which may be considered as existing on the neutral in our system is the resultant difference between the positive and negative loads at the source of supply. This bonding and grounding of all the cable-casings is effected at every subsidiary manhole and at all other possible points and neutralizes at each and every one of these points all differences of balance, leaving only the excess. This is therefore equivalent to extending over the entire system of feeders and mains a neutral bus having a capacity practically equal to infinity. To illustrate further, let it be supposed that instead of having a system of many insulated feeders and mains a vast metal plate be substituted therefor. In this plate the hundreds of house-services pour their unneutralized differences, which immediately cancel each other and leave on the plate a resultant only which is connected at some point to the source of supply. Our system therefore also eliminates all loss due in the system now in vogue to the flow of the unbalanced current over the insulated neutral mains and feeders and effects not only a constant saving in operation, but also a vast improvement in the regulation of the potential of the system. It will be manifest that it also reduces the cost of distribution of electrical energy as generated by the three-wire system to almost one-third, there being two sets of cables for the feeders and mains instead of three and two sets of ducts or conduits instead of three, or, what amounts to the same thing, any system may be increased in capacity by one-half by utilizing the neutrals already installed for positive and negative cables.

In the foregoing description and in the following claims we have referred to the feeders and mains as positive and negative, which might be interpreted to mean that our invention applied only to the direct-current system. An alternating current may be considered as having a positive and negative side for an instant of time, and it is obvious that our system may be successfully carried out with either an alternating or direct current.

Furthermore, we have referred to the positive, neutral, and negative busses at source of supply; but it is obvious that where a three-wire system of low-tension alternating distribution is fed by single or banked transformers the secondary coils of these transformers may be utilized instead of the positive, neutral, and negative busses, and when this is done these secondary coils correspond in every way to the busses referred to and the transformers become the source of supply. It will be seen, therefore, that our invention applies to any system of three-wire low-tension distribution, either direct or having one or more sources of supply and when fed either from busses or their equivalent.

We have also described our invention in connection with metallic-sheathed cables, the sheathings of the various circuits formed thereby being bonded together to form a common neutral. While we prefer to use such cables, our invention is not limited thereto, as any form of conductor may be employed which has an outer metallic covering insulated therefrom.

It will be understood, of course, that while our invention has been described as relating particularly to underground systems of electrical distribution it is applicable also to overhead systems and interior wiring.

Having now described our invention, what we claim as new, and desire to secure by Letters Patent, is—

1. A three-wire system of electrical distribution comprising a plurality of sets of positive and negative conductors, metallic coverings for said conductors insulated therefrom, and a common neutral formed by the bonded coverings of the different sets of positive and negative conductors.

2. A three-wire system of electrical distribution comprising a plurality of sets of positive and negative conductors, metallic coverings for said conductors insulated therefrom, and a common neutral formed by the bonded and grounded coverings of the different sets of positive and negative conductors.

3. A three-wire system of electrical distribution in which the various neutral cables are eliminated, comprising several sets of positive and negative conductors in metallic-sheathed cables, and a common neutral formed by the bonded sheathings of the various positive and negative conductors.

4. A three-wire system of electrical distribution in which the neutral cable is eliminated, comprising positive and negative feeders and mains in metallic-sheathed cables and a neutral conductor formed by the grounded sheathings of said cables, the sheathings of the various sets of positive and negative feeder-cables being bonded electrically, to form a common neutral feeder.

5. A three-wire system of electrical distribution in which the neutral cable is eliminated, comprising positive and negative feeders and mains in metallic-sheathed cables, and a neutral conductor formed by the grounded sheathings of said cables, the sheathings of the various sets of positive and negative main cables being electrically bonded to form one common neutral main.

6. A three-wire system of electrical distribution in which the neutral cable is eliminated, comprising positive and negative feeders and mains in metallic-sheathed cables, the sheathings of the various sets of positive and negative feeder and main cables being electrically bonded and permanently grounded at different points to form one common neutral.

7. A three-wire system of underground electrical distribution in which all the neutral feeder and main cables are eliminated, comprising a plurality of positive and negative feeders and mains, and a common neutral practically equivalent to one of infinite capacity, whereby all unbalanced currents may be neutralized at all points of the system, leaving only the resultant excess on the common neutral.

8. A three-wire system of underground electrical distribution in which the several neutral cables are eliminated, comprising a plurality of sets of positive and negative conductors in metallic-sheathed cables, a common neutral formed by the bonded and grounded sheathings of the various positive and negative conductors, and house-circuits leading therefrom, the positive and negative wires of which are respectively connected to the positive and negative conductors, and the neutral wire of which is connected to said common neutral, and thereby grounded.

9. A three-wire system of underground electrical distribution in which the several neutral cables are eliminated, comprising a plurality of sets of positive and negative conductors in metallic-sheathed cables, the sheathings of the various cables being electrically bonded and permanently grounded, a common neutral formed by said sheathings, and house-circuits, the positive and negative wires of which are respectively connected to the positive and negative conductors, and the neutral wire of which is connected to said common neutral.

10. A three-wire system of underground electrical distribution in which the several neutral cables are eliminated, comprising positive, negative and neutral busses, at source of supply, the neutral bus being permanently grounded, a plurality of sets of positive and negative feeders in metallic-sheathed cables leading respectively from the positive and negative busses, the sheathings of the various cables being electrically bonded and metallically connected to the neutral bus, metallic-sheathed main cables connected with said feeders and a common neutral formed by the bonded sheathings of the various feeder and main cables.

11. A three-wire system of underground electrical distribution in which the neutral cable is eliminated, comprising positive, negative and neutral busses at source of supply, the neutral bus being permanently grounded, positive and negative feeders in metallic-sheathed cables leading respectively from the positive and negative busses, the sheathings of the feeder-cables being electrically bonded and metallically connected to the neutral bus, positive and negative mains connected with said feeders, in metallic-sheathed cables, the sheathings of the main cables being bonded and permanently grounded at different points, and a common neutral formed by the bonded and grounded sheathings of the feeder and main cables.

12. A three-wire system of underground electrical distribution in which the neutral cable is eliminated, comprising positive, negative and neutral busses at source of supply, the neutral bus being permanently grounded, positive and negative feeders in metallic-sheathed cables leading respectively from the positive and negative busses, the sheathings of the feeder-cables being electrically bonded and metallically connected to the neutral bus, positive and negative mains connected with said feeders, in metallic-sheathed cables, the sheathings of the main cables being bonded with each other and with the sheathings of the feeder-cables, and permanently grounded, at different points, and a common neutral formed by the bonded and grounded sheathings of the feeder and main cables.

13. A three-wire system of underground electrical distribution in which the neutral cable is eliminated, comprising positive, negative and neutral busses at source of supply, the neutral bus being grounded, a plurality of positive and negative feeders and mains leading respectively from the positive and negative busses, and a common grounded neutral for all of said feeders and mains, connected with the neutral bus, whereby the different currents of opposite polarity may be neutralized at their sources and the resultant excess may be taken from said neutral bus.

In testimony whereof we have hereunto set our hands in presence of two subscribing witnesses.

WARREN B. REED.
LYMAN C. REED.

Witnesses:
J. READ CHILDRESS,
ALONZO CHURCH.